US006819635B2

(12) United States Patent
McIntosh et al.

(10) Patent No.: US 6,819,635 B2
(45) Date of Patent: Nov. 16, 2004

(54) PORTABLE CLOCK WITH CHIME SIGNAL

(75) Inventors: Stephen Ian McIntosh, Boulder, CO (US); Harold Pierce, Westlake Village, CA (US); Steven E. Muenter, Van Nuys, CA (US)

(73) Assignee: Now & Zen, Inc., Boulder, CO (US)

( * ) Notice: Subject to any disclaimer, the term of this patent is extended or adjusted under 35 U.S.C. 154(b) by 84 days.

(21) Appl. No.: 10/449,055

(22) Filed: May 30, 2003

(65) Prior Publication Data

US 2003/0223314 A1 Dec. 4, 2003

Related U.S. Application Data

(60) Provisional application No. 60/384,515, filed on May 31, 2002.

(51) Int. Cl.[7] ........................ G04B 21/00; G04B 25/00; G01H 7/00

(52) U.S. Cl. ....................... 368/273; 368/272; 368/108; 84/600

(58) Field of Search ................................ 368/272–273, 368/167, 72, 73, 107–113; 84/600, 609–612

(56) References Cited

U.S. PATENT DOCUMENTS

| | | | | |
|---|---|---|---|---|
| 3,777,701 A | * | 12/1973 | Nofziger | 116/149 |
| 4,358,838 A | * | 11/1982 | Nakamura | 368/75 |
| 5,959,527 A | * | 9/1999 | Beder et al. | 340/392.4 |
| 6,236,622 B1 | * | 5/2001 | Blackman | 368/10 |
| 2002/0012291 A1 | * | 1/2002 | Robinett | 368/73 |

* cited by examiner

*Primary Examiner*—David Martin
*Assistant Examiner*—Michael L. Lindinger
(74) *Attorney, Agent, or Firm*—Emery L. Tracy

(57) ABSTRACT

A portable alarm clock is provided. The alarm clock comprises a base receptacle sized and shaped for portability. A striking plate is secured and receivable within the base receptacle with a striking mechanism secured to the striking plate. A chime plate is secured to the striking plate with an chime bar secured to the chime plate. A clock mechanism programs chime functions and displays time and is hingedly secured to the chime plate. A cover is secured to the clock mechanism for closing the base receptacle wherein the striking plate, the striking mechanism, the chime plate, the acoustic chime bar, and the clock means are receivable within the base receptacle and the cover closing the base receptacle.

17 Claims, 4 Drawing Sheets

PORTABLE CLOCK WITH CHIME SIGNAL

This application claims benefit of 60/384,515 filed May 31, 2002.

BACKGROUND OF THE INVENTION

1. Field of the Invention

This invention relates generally to a portable clock and, more particular, the invention relates to portable clock with a chime signal which can be programmed to countdown to zero and chime at decreasing periodic intervals or to strike its chime repeatedly at any set interval.

2. Description of the Prior Art

Mechanical alarm clocks were invented in the nineteenth century and changed little until the advent of the quartz clock movement in the 1970s. This led to the production of a wide variety of novelty alarm clocks which woke the users with some version of loud and unpleasant sound. The present invention is the first portable alarm clock with a mechanically-actuated acoustic alarm sound that wakes the user gradually and gently with a series of chime strikes that increase in frequency over a ten (10) minute period. Therefore, it would be desirable to have a portable alarm clock that can produce a pleasant awakening experience with gentle acoustic chimes.

Beyond its use and function as an alarm clock, the present invention serves as a periodic chiming timer for meditation, yoga, or similar spiritual practices. Bells and chimes have been used by practitioners of these ancient traditions as signals to begin or end the practice, or as periodic signals that tell the meditator to refocus or to tell the yoga practitioner to change positions. Traditionally, these chime signals have been produced by hand by the teacher or leader of the practice. But, the present invention allows the practitioner to practice with these signals without the necessity of a third part to ring the chime. Because of the importance of maintaining a quiet and aesthetically pleasant environment for such practices, the conventional timers for sports or for culinary activities are not suitable for spiritual practice due to their electronic beeping sounds or aesthetically unpleasant bell signal sounds. The present invention thus provides the functionality and the aesthetic sound quality that has not been previously available to these practitioners.

Long-resonating, aesthetically beautiful bells and chimes are used in both Eastern and Western meditation traditions. In the Christian monastic tradition, the ringing of the bell during meditation reminds the practitioners to return to the object of worship. Similarly, Zen monks have used gongs and “mindfulness chimes” to begin their meditations and during meditation to bring them out of their mental processes back to the stillpoint of emptiness. Therefore, it would also be desirable to have a portable clock with a countdown mode repeat function allowing the aesthetically beautiful chime to sound repeatedly at any set period so that as the chime repeats, it brings the meditator back to the focal point of concentration.

SUMMARY

The present invention is a portable clock. The portable clock comprises a chime, a striking mechanism for striking the chime, and means for causing the striking mechanism to strike the chime in a predetermined decreasing interval progression countdown countdown thereby moving a person from mental processes back to a stillpoint of emptiness.

In addition, the present invention includes a portable alarm clock. The alarm clock comprises a base receptacle sized and shaped for portability. A striking plate is secured and receivable within the base receptacle with a striking mechanism secured to the striking plate. A chime plate is secured to the striking plate with a chime secured to the chime plate. A clock mechanism programs chime functions and displays time and is hingedly secured to the chime plate. A cover is secured to the clock mechanism for closing the base receptacle wherein the striking plate, the striking mechanism, the chime plate, the chime, and the clock means are receivable within the base receptacle and the cover closing the base receptacle.

The present invention further includes a method for timing yoga and meditation exercises and bringing a meditator back to the focal point of concentration. The method comprises providing a chime, enclosing the chime is closable receptacle, and striking the chime in a predetermined decreasing interval progression countdown.

DETAILED DESCRIPTION OF THE PREFERRED EMBODIMENTS

Figure 1:
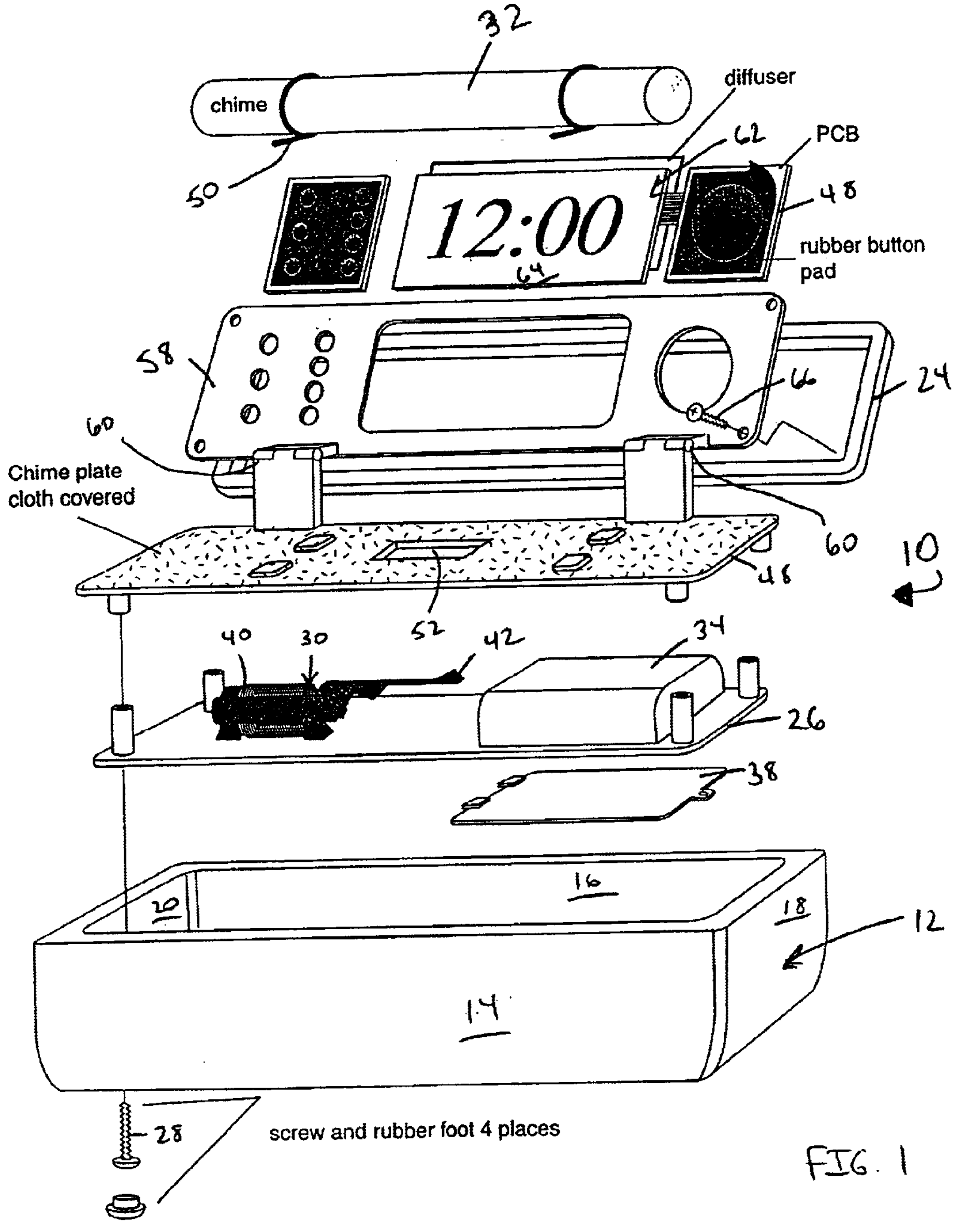
FIG. 1 is an exploded view illustrating a portable clock with chime signal constructed in accordance with the present invention.
Figure 2:
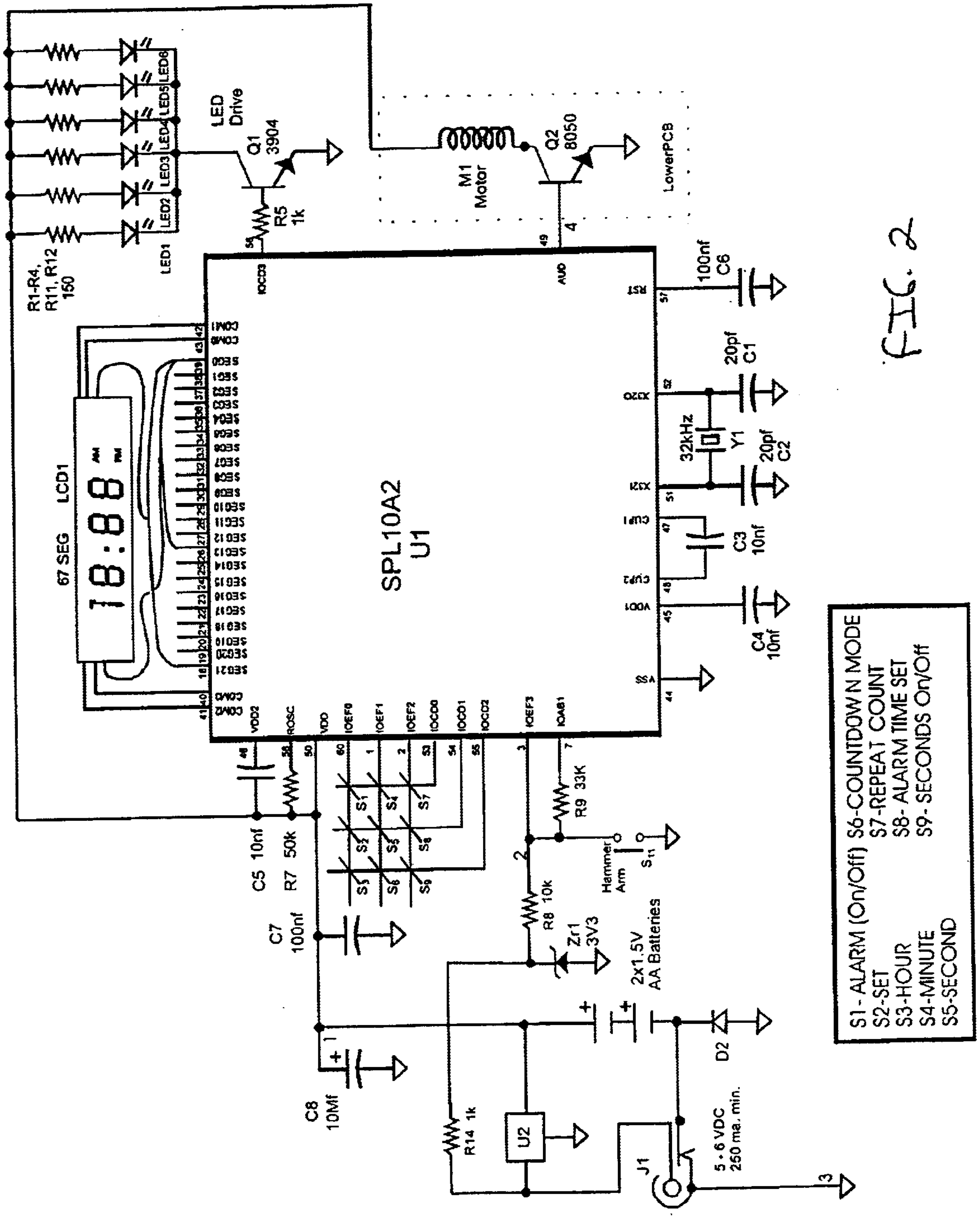
FIG. 2 is a schematic view illustrating electronics of the portable clock with chime signal of FIG. 1, constructed in accordance with the present invention.
Figure 3:
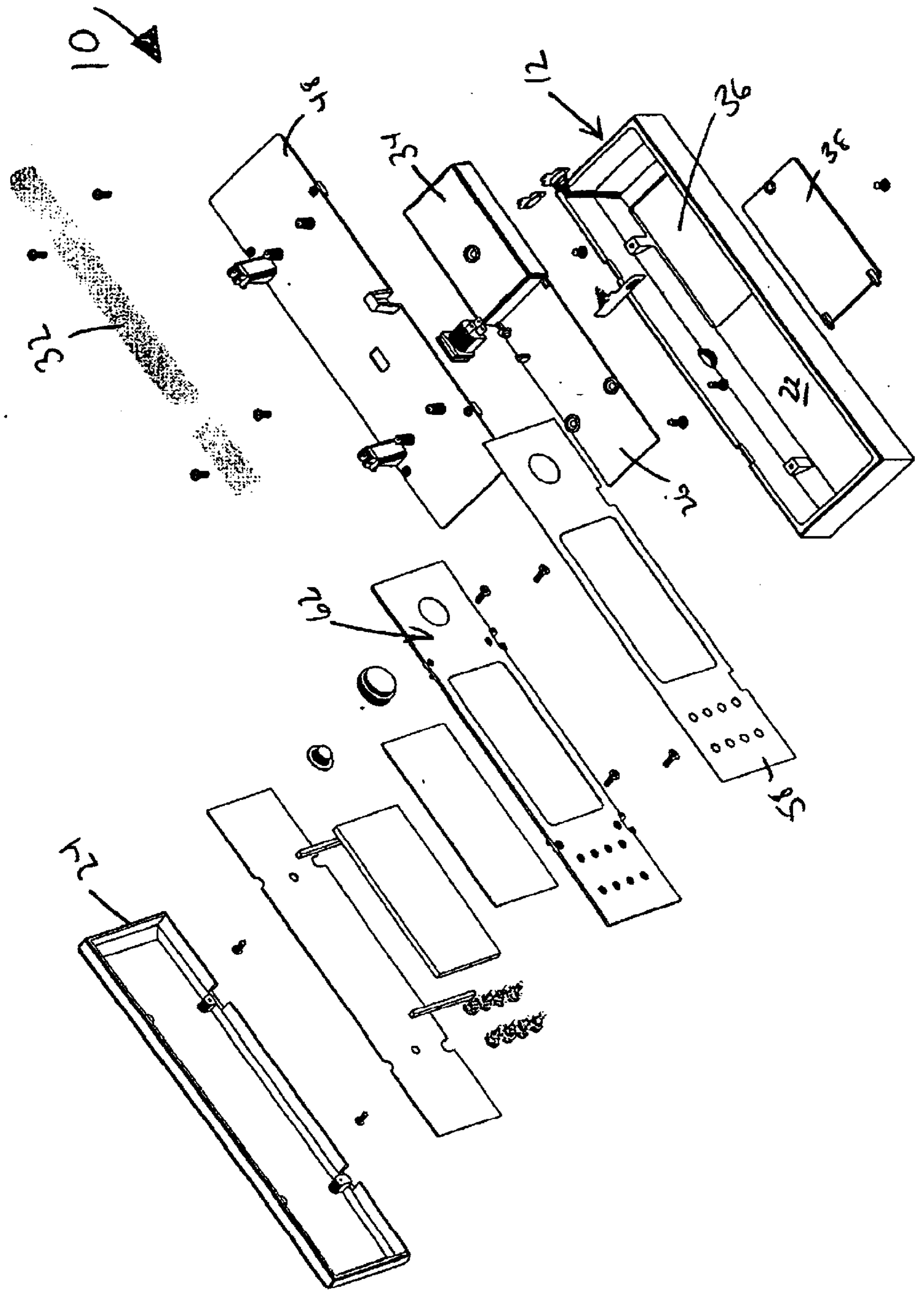
FIG. 3 is an exploded view illustrating the portable clock of FIG. 1, constructed in accordance with the present invention.

As illustrated in FIG. 1, the present invention is a portable clock, indicated generally at 10, with chime signal for bringing meditators out of their mental processes back to the stillpoint of emptiness. The portable clock 10 of the present invention is a horological instrument using a mechanical chime mechanism for annunciation, whereby the initiation of the chime striking mechanism is controlled and automatically adjusted to insure that the striking of the chime occurs synchronously with the clock timer and display reaching the preassigned trigger time, thereby compensating for changes in battery voltage, or mechanical wear, or production tolerances of the striking mechanism. The present invention serves as an alarm clock and as a chiming timer designed for use in practices such as meditation and yoga. Furthermore, the portable clock 10 has a countdown mode repeat function allowing an aesthetically beautiful chime to sound repeatedly at any set period so that as the chime repeats, it brings the meditator back to the focal point of concentration.

The portable clock 10 of the present invention includes a base receptacle 12 having a first side wall 14, a second side wall 16 opposite to and substantially parallel to the first side wall 14, a third side wall 18 between the first side wall 14 and the second side wall 16, a fourth side wall 20 opposite the third side wall 18 and between the first side wall 14 and the second side wall 16, and a base wall 22 between the first side wall 14, the second side wall 16, the third side wall 18, and the fourth side wall 20.

A cover plate 24 is hingedly secured to the base receptacle 12 such that the cover plate 24 alternatively moves between an open position during use and a closed position for traveling and storage. The hinged connection between the cover plate 24 and the base receptacle 12 will be discussed in further detail below.

Preferably, the base receptacle 12 and the cover plate 24 are constructed from a wood material although constructing the base receptacle 12 and the cover plate 24 from other materials including, but not limited to, plastic, metal, glass, etc., is within the scope of the present invention.

In one embodiment, the combined base receptacle 12 and cover plate 24 have a length of approximately nine (9") inches, a width of approximately two (2") inches, and a height of approximately two (2") inches. In another embodiment, the combined base receptacle 12 and cover plate 24 have a length of approximately seven and one-half (7½") inches, a width of approximately two (2") inches and a height of approximately two (2") inches. It should be noted, however, that it is within the scope of the present invention that the combined base receptacle 12 and cover plate 24 have other dimensions other than those set forth above.

The portable clock 10 of the present invention further includes a striking plate 26 secured within the base receptacle 12 by screws 28 or the like. The striking plate 26 includes a cam driven striking mechanism 30 for striking a chime bar 32 and a battery compartment 34 for receiving batteries (not shown) or other self-contained power source. The battery compartment 34 is aligned with an opening 36 formed in the base receptacle 12 such that batteries can be inserted into the battery compartment 34 through the base receptacle opening 36. A releasably secured battery cover 38 for the battery compartment 34 can also be provided to assist in maintaining the batteries within the battery. compartment 34. Furthermore, the portable clock 10 can be constructed with AC power means for receiving an AC power plug.

The cam driven striking mechanism 30 has a gearbox 40 for moving a striking hammer 42 in a general direction away from the chime bar 32 and then releasing the striking hammer 42 at the preprogrammed time or time interval. As the striking mechanism 30 draws the striking hammer 42 away from the chime bar 32, the striking striking hammer 42 contacts at least one spring secured to the striking plate 26 and electrically connected to a clock timer 46 of the portable clock 10. Once the striking hammer 42 depresses the springs, the striking hammer 42 is released to strike the chime bar 32. In this manner, the striking mechanism 30 is controlled and the timing is automatically adjusted to insure that the striking of the chime bar 32 by the striking hammer 42 occurs synchronously with the clock timer 46 and display reaching the preassigned trigger time. Compensation for changes in battery voltage, or mechanical wear, or production tolerances of the striking mechanism 30 are also a part of the clock timer 46.

In addition, the portable clock of the present invention includes a chime plate 48 secured to the striking plate 26 utilizing the same screws 28 which secure the striking plate 26 to the base receptacle 12. The chime bar 32 is secured to the chime plate 48 in a manner allowing the cam driven striking mechanism 30 to strike the chime bar 32 at a predetermined time or at predetermined intervals. In a preferred embodiment, the chime bar 32 is actually suspended above the chime plate 48 by a pair of strings or threads 50 which are looped and/or knotted about the chime bar 32 and tied to the chime plate 48. At least a portion of the cam driven striking mechanism 30 can travel through an aperture 52 formed in the chime plate 48 striking the chime bar 32.

In an alternative embodiment, the striking plate 26 is secured to the chime plate 48 by a plurality of screws. Then, the combined striking plate 26 and chime plate 48 are placed within the base receptacle 12. Different screws extending through the chime plate 48 connect the combined striking plate 26 and chime plate 48 within the base receptacle 12.

The chime bar 32 of the portable clock 10 of the present invention can be "tuned" to find the "sweet spot". The chime bar 32 can be adjusted by changing the position of the chime-bar 32 on the strings 50 relative to the striking point of the striking mechanism 30. The chime bar 32 position is changed by physically moving the chime bar 32 around within the strings 50. The user then listens to the chime sound of the chime bar 32 until the chime sound and resonation of the chime bar 32 is optimized or desirable to the ears of the user.

Figure 4:
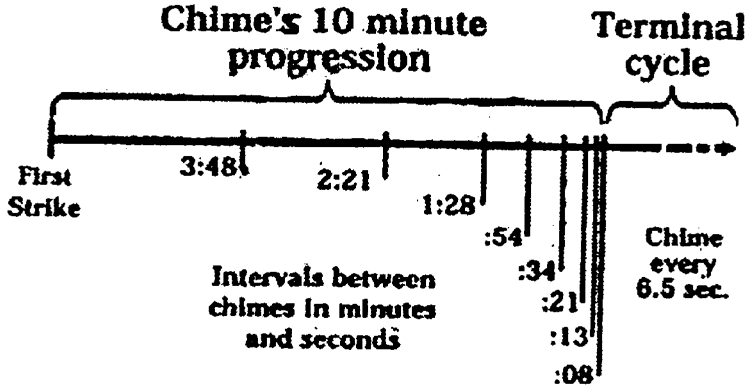
FIG. 4 is a schematic illustrating the countdown function of the portable clock with the striking mechanism striking the chime bar in periodic decreasing intervals.

As described above, the portable clock 10 of the present invention has the ability to countdown in periodic decreasing intervals with the striking mechanism 30 striking the chime bar 32 at the preprogrammed time. As illustrated in FIG. 4, the first strike of the chime bar 32 is at the ten (10) minute period, the second strike is at the three minutes and forty-eight seconds (3:48) period, the third strike is a the two minutes and twenty-one seconds (2:21) period, etc. Once the ten (10) minute period has lapsed, a terminal cycle begins with a chime every six and one-half seconds (0:06.5).

It should be noted that while the chime bar 32 has been described and illustrated as being an elongated bar, it is within the scope of the present invention to have any type chime for producing a tone.

The portable clock 10 of the present invention further includes a clock plate 58 hingedly secured to the chime plate 48 by a pair of hinges 60. A programmable clock mechanism 62 having the clock timer 46 and display 64 is secured to the clock plate 58. The clock plate 58 and the clock mechanism 62 are secured within the cover plate 24 by screws 66 or the like.

The following features are included with the portable clock 10 of the present invention:

1. The portable clock 10 of the present invention is a horological instrument using a mechanical chime for annunciation, whereby the initiation of the chime striking mechanism is controlled and automatically adjusted to insure that the striking of the chime occurs synchronously with the clock timer and display reaching the preassigned trigger time, thereby compensating for changes in battery voltage, or mechanical wear, or production tolerances of the striking mechanism.

The portable clock 10 of the present invention is a portable horological instrument with a mechanically driven chime which exhibits a "Soft" wake cycle.

The portable clock 10 of the present invention has a countdown timer with a mechanically driven chime and LCD for display and setting countdown times.

The portable clock 10 of the present invention has a countdown timer with a mechanically driven chime and LCD for display and setting countdown times with repeat cycle.

The portable clock 10 of the present invention is a portable horological instrument with a mechanically driven chime which exhibits a "soft" wake cycle with a countdown timer and a mechanically driven chime and LCD for display and setting countdown times.

The portable clock 10 of the present invention is a portable horological instrument with a mechanical chime mechanism controlled by a digital microprocessor.

The portable clock 10 of the present invention includes an annunciation of the chime based on a golden mean annunciation cycle.

The portable clock 10 of the present invention include a portable microprocessor controlled horological instrument with a mechanically driven chime striking, whereby the rest position of the striking is detected by the microprocessor.

The portable clock 10 of the present invention can be actively incorporated into meditation practice as a form of "mantra" or "yantra". The chiming of the portable clock 10 can be used as an external mantra or sonic yantra. In addition, the portable clock's 10 countdown mode repeat function allows the chime to sound repeatedly at any set period so that as the chime repeats, it brings the meditator back to the focal point of concentration.

In use, the portable clock 10 of the present invention can be programmed to countdown to zero and chime, or to strike its chime repeatedly at any set interval. In the alarm clock or countdown timer modes, as illustrated in FIG. 4, the portable clock's 10 chime gradually increases through a pre-programmed 10 minute progression. The portable clock 10 can also be set to chime once every hour on the hours a "mindfulness chime".

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A portable clock, the portable clock comprising:

an acoustic chime bar;

a striking mechanism for striking the an acoustic chime bar; and means for causing the striking mechanism to strike the acoustic chime bar in a predetermined decreasing interval progression countdown thereby moving a person from mental processes back to a stillpoint of emptiness;

wherein the predetermined decreasing interval progression countdown is as follows:

a) first strike at ten minutes (10:00);

b) second strike at three minutes and forty-eight seconds (3:48);

c) third strike at two minutes and twenty-one seconds (2:21);

d) fourth strike at one minute and twenty-eight seconds (1:28);

e) fifth strike at fifty-four seconds (0:54);

f) sixth strike at thirty-four seconds (0:34);

g) seventh strike at twenty-one seconds (0:21);

h) eighth strike at thirteen seconds (0:13); and i) ninth strike at eight seconds (0:08).

2. The portable clock of claim 1 wherein the predetermined decreasing interval progression countdown is followed by a terminal cycle with the striking mechanism striking the acoustic chime bar at six and one-half seconds (0:06.5) intervals.

3. The portable clock of claim 1 and further comprising:

a base receptacle;

a striking plate secured within the base receptacle, the striking mechanism secured to the striking plate;

a chime plate secured to the striking plate, the acoustic chime bar secured to the chime plate;

clock means for programming chime functions and displaying time hingedly secured to the chime plate; and a cover secured to the clock means for closing the base receptacle.

4. The portable clock of claim 3 wherein the acoustic chime bar is an aluminum chime bar, the chime bar being adjustably secured to and elevated above the chime plate by at least one string.

5. The portable clock of claim 1 wherein the initiation of the striking mechanism is controlled and automatically adjusted such that the striking of the acoustic chime bar occurs synchronously with a clock timer and display reaching the preassigned trigger time and compensating for changes in battery voltage, mechanical wear, and production tolerances of the striking mechanism.

6. The portable clock of claim 5 and further comprising:

computer means for controlling the striking mechanism.

7. An alarm clock, the alarm clock comprising:

a base receptacle sized and shaped for portability;

a striking plate secured and receivable within the base receptacle;

a striking mechanism secured to the striking plate;

a chime plate secured to the striking plate;

an acoustic chime bar secured to the chime plate;

clock means for programming chime functions and displaying time hingedly secured to the chime plate; and a cover secured to the clock means for closing the base receptacle;

wherein the striking plate, the striking mechanism, the chime plate, the chime, and the clock means are receivable within the base receptacle and the cover closing the base receptacle.

8. The alarm clock of claim 7 and further comprising: means for causing the striking mechanism to strike the chime in a predetermined decreasing interval progression countdown.

9. The alarm clock of claim 8 wherein the predetermined decreasing interval progression countdown is as follows:

a) first strike at ten minutes (10:00);

b) second strike at three minutes and forty-eight seconds (3:48);

c) third strike at two minutes and twenty-one seconds (2:21);

d) fourth strike at one minute and twenty-eight seconds (1:28);

e) fifth strike at fifty-four seconds (0:54);

f) sixth strike at thirty-four seconds (0:34);

g) seventh strike at twenty-one seconds (0:21);

h) eighth strike at thirteen seconds (0:13); and i) ninth strike at eight seconds (0:08).

10. The alarm clock of claim 9 wherein the predetermined decreasing interval progression countdown is followed by a terminal cycle with the striking mechanism striking the acoustic chime bar at six and one-half seconds (0:06.5) intervals.

11. The alarm clock of claim 3 wherein the acoustic chime bar is an aluminum chime bar, the chime bar being adjustably secured to and elevated above the chime plate by at least one string.

12. The alarm clock of claim 7 wherein the initiation of the striking mechanism is controlled and automatically adjusted such that the striking of the chime occurs synchronously with a clock timer and display reaching the preassigned trigger time and compensating for changes in battery voltage, mechanical wear, and production tolerances of the striking mechanism.

13. The portable clock of claim 12 and further comprising:

computer means for controlling the striking mechanism.

14. A method for timing yoga and meditation exercises and bringing a meditator back to the focal point of concentration, the method comprising:

providing an acoustic chime bar;

enclosing the acoustic chime bar in closable receptacle;

striking the acoustic chime bar in a predetermined decreasing interval progression countdown;

striking the chime at ten minutes (10:00);

striking the chime at three minutes and forty-eight seconds (3:48);

striking the chime at two minutes and twenty-one seconds (2:21);

striking the chime at one minute and twenty-eight seconds (1:28);

striking the chime at fifty-four seconds (0:54);

striking the chime at thirty-four seconds (0:34);

striking the chime at twenty-one seconds (0:21);

striking the chime at thirteen seconds (0:13); and striking the chime at eight seconds (0:08).

15. The method of claim 14 and further comprising:

striking the acoustic chime bar at six and one-half seconds (0:06.5) intervals after the predetermined decreasing interval progression countdown.

16. A method for timing yoga and meditation exercises and bringing a meditator back to the focal point of concentration, the method comprising providing an acoustic chime bar;

enclosing the acoustic chime bar in closable receptacle;

striking the acoustic chime bar in a predetermined decreasing interval progression countdown;

securing the acoustic chime bar within the base receptacle by at least one string; and adjusting the chime for a predetermined tone.

17. The method of claim 16 and further comprising:

controlling and automatically adjusting the timing of the striking of the acoustic chime bar such that the striking of the acoustic chime bar occurs synchronously with a clock timer and display reaching the preassigned trigger time and compensating for changes in battery voltage, mechanical wear, and production tolerances of the striking mechanism.

* * * * *